US008553587B2

(12) United States Patent
Aggarwal

(10) Patent No.: US 8,553,587 B2
(45) Date of Patent: Oct. 8, 2013

(54) SYSTEM AND METHOD FOR FINDING IMPORTANT NODES IN A NETWORK

(75) Inventor: Charu C. Aggarwal, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 289 days.

(21) Appl. No.: 13/036,083

(22) Filed: Feb. 28, 2011

(65) Prior Publication Data

US 2012/0218908 A1 Aug. 30, 2012

(51) Int. Cl.
*H04L 12/26* (2006.01)
(52) U.S. Cl.
USPC .......................................................... 370/256
(58) Field of Classification Search
None
See application file for complete search history.

(56) References Cited

U.S. PATENT DOCUMENTS

| 2005/0007997 A1* | 1/2005 | Morton et al. | 370/351 |
| 2006/0136098 A1* | 6/2006 | Chitrapura et al. | 700/262 |
| 2010/0195516 A1* | 8/2010 | McReynolds et al. | 370/252 |

OTHER PUBLICATIONS

Aggarwal et al., XProj: A Framework for Projected Structural Clustering of XML Documents, KDD Conference, 2007.
Agrawal et al., Efficient Maintenance of Transitive Relationships in Large Data and Knowledge Bases, ACM SIGMOD Conference, 1989, ACM, pp. 253-262.
Burdick et al., MAFIA: A Maximal Frequent Itemset Algorithm, IEEE Trans. on Knowl. and Data Eng. V. 17, N. 11, p. 1490-1504, 2005.
Chakrabarti et al., R-MAT: A Recursive Model for Graph Mining, SDM Conference, 2004.
Cheng et al., Fast Computing Reachability Labelings for Large Graphs with High Compression Rate, EDBT Conference, 2008.
Cohen et al., Reachability and Distance Queries via 2-hop Labels, ACM Symposium on Discrete Algorithms, 2002.
Dalvi et al., Keyword Search on External Memory Data Graphs, VLDB Conference, 2008.
Dijkstra, A Note on Two Problems in Connection with Graphs, Numerische Mathematik, 1 (1959), S. 269-271.
Faloutsos et al., On Power Law Relationships of the Internet Topology, SIGCOMM Conference, 1999.
Feigenbaum et al., Graph Distances in the Data Stream Model, SIAM Journal on Computing, 38(5), pp. 1709-1727, 2005.
Gibson et al., Discovering Large Dense Subgraphs in Massive Graphs, VLDB Conference, 2005.
Goldberg et al., Computing Point-to-Point Shortest Paths from External Memory, Alenex, 2005.
Goldman et al., Proximity Search in Databases, VLDB Conference, 1998.
Jin et al., Efficiently Answering Reachability Queries in very Large Directed Graphs, ACM SIGMOD Conference, 2008.
Kashima et al., Marginalized Kernels between Labeled Graphs, ICML, 2003.

(Continued)

*Primary Examiner* — Raj Jain
(74) *Attorney, Agent, or Firm* — Ryan, Mason & Lewis, LLP

(57) ABSTRACT

Techniques for optimizing steady state flow of a network are provided. The techniques include determining a first set of two or more nodes in a network, computing a steady-state flow probability of the first set of two or more nodes, and iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained.

22 Claims, 4 Drawing Sheets

(56) References Cited

OTHER PUBLICATIONS

Kudo et al., An Application of Boosting to Graph Classification, NIPS Conf. 2004.
Papadias et al., Query Processing in Spatial Network Databases, VLDB Conference, pp. 802-813, 2003.
Raghavan et al., Representing Web Graphs, ICDE Conference, pp. 405-416, 2003.
Samet et al., Scalable Network Distance Browsing in Spatial Databases, ACM SIGMOD Conference, 2008.
Shekhar et al., CCAM: A Connectivity-Clustered Access Method for Networks and Network Computations, IEEE Trans. Knowl. Data Eng. (TKDE), 9(1):102-119, 1997.
Xiao et al., Efficiently Indexing Shortest Paths by Exploiting Symmetry in Graphs, EDBT Conference, 2009.
Wang et al., Dual Labeling: Answering Graph Reachability Queries in Constant Time, ICDE Conference, 2006.
Yan et al., CloseGraph: Mining Closed Frequent Graph Patterns, ACM KDD Conference, 2003.
Yan et al., Mining Significant Graph Patterns by Scalable Leap Search, SIGMOD Conference, 2008.
Yan et al., Graph Indexing: A Frequent Structure-based Approach, SIGMOD Conference, 2004.
Zaki et al., XRules: An Effective Structural Classifier for XML Data, KDD Conference, 2003.
Berger et al. On the Spread of Viruses in the Internet. SODA, 2005.
Chakrabarti et al. Epidemic Thresholds in Real networks. ACM Trans. on Inf. Systems and Security, 10(4), 2008.
Brin et al. The Anatomy of a Large Scale Hypertextual Search Engine, WWW Conference, 1998.
Cook et al. Mining Graph Data, John Wiley and Sons Inc, 2007.
Domingos et al. Mining the Network Value of Customers. ACM KDD Conference, 2001.
Freeman, Centrality in Social Networks: Conceptual Clarification. Social Networks, 1, pp. 215-239, 1979.
Kleinberg, Authoritative Sources in a Hyperlinked Environment. Journal of the ACM 46(5) pp. 604-632, 1999.
Kumar et al. The Web as a Graph. ACM PODS Conference, 2000.
Kumar et al. Trawling the web for emerging cyber-communities. WWW Conference, 1999.
Leskovec et al. Cost-Effective Outbreak Detection in Networks. KDD Conference, 2007.
Leskovec et al. Cascading Behavior in Large Blog Graphs, SDM Conference, 2007.
Newman et al. Email Networks and the Spread of Computer Viruses, Phys. Rev. E 66, 035101, 2002.
Newman, The Spread of Epidemic Disease on Networks, Phys. Rev. E 66, 016128, 2002.
Rattigan et al. Graph Clustering with Network Structure Indices, ICML, 2007.
Song et al. Modeling and Predicting Personal Information Dissemination Behavior. ACM KDD Conference, 2005.
Wang et al. Epidemic Spreading in Real Networks: An Eigenvalue Viewpoint, SRDS, pp. 25-34, 2003.
Wang et al. On Computer Viral Infection and the Effect of Immunization. ACM Annual Comp. Security App. Conf., 2002.
Wu et al. Information Flow in Social Groups, Physical A: Statistical and Theoretical Physics, vol. 337, Issues 1-2, 1, pp. 327-335, 2004.
Zou et al. Email Virus Propagation Modeling and Analysis, UMass Technical Report TR-CSE-03-04, 2004.
Facebook, http://www.facebook.com, accessed May 11, 2011.
Linkedin, http://www.linkedin.com, accessed May 11, 2011.

\* cited by examiner

SYSTEM AND METHOD FOR FINDING IMPORTANT NODES IN A NETWORK

FIELD OF THE INVENTION

Embodiments of the invention generally relate to information technology, and, more particularly, to network analysis.

BACKGROUND OF THE INVENTION

In recent years, social networks have found increasing popularity. Social networks are known to enjoy the benefits of a network effect, wherein the increase in the size of the social network also increases the perceived benefits of using it. Much of this benefit is embedded in the information flows in the social network. The information flows arise as a result of the communication between the different entities in the social network. As such, social networks serve as a useful tool for dissemination of information between individuals on large networks. A challenge, however, exists in determining relevant and/or important nodes in such networks.

An information flow can be impacted, for example, by the network topology and the intensity of information flow interactions between different nodes. Also, information flow authorities are defined as a small group of members at which the dissemination of information leads to the most rapid spread throughout a social network. The concept of information authorities is peripherally related to that of the concept of hubs and authorities in web networks. The concept of hubs and authorities is used to find central points of influence in web networks. However, the concept of information flow authorities is different from that of the hub-authority framework, in that it is more dependent upon the structure of the flows along the underlying network. This is dependent both upon the structural characteristics of the network and the flow intensity along different edges.

The flow authorities in a social network are likely to be central and well connected entities in the network. However, the local structural measures alone do not provide a global view of the {\em centrality of flows} in a social network. Additionally, a related challenge is that of virus propagation in computer networks and epidemic spreading.

SUMMARY OF THE INVENTION

Principles and embodiments of the invention provide techniques for finding important nodes in a network. An exemplary method (which may be computer-implemented) for optimizing steady state flow of a network, according to one aspect of the invention, can include steps of determining a first set of two or more nodes in a network, computing a steady-state flow probability of the first set of two or more nodes, and iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
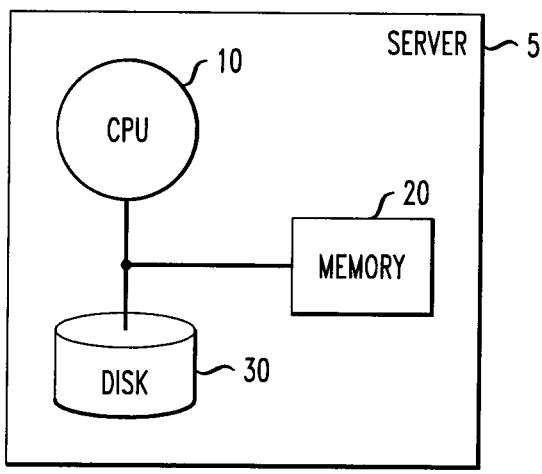
FIG. 1 is a diagram illustrating example architecture, according to an embodiment of the present invention.

Principles of the invention include determining influential, relevant and/or important nodes in a network. A node can be considered influential, relevant and/or important in a social network when it is essential to dissemination of information in the network. For example, a centrally located node with high transmission rates would be considered important. One or more embodiments of the invention include determining a number of nodes at which the dissemination of information leads to the maximum spread of information in a network, further including a stochastic information flow model used to determine the authoritative representatives in the underlying social network. The techniques described herein can include leveraging such a flow model to design an approach for determining influential, relevant and/or important nodes in social networks.

Also, a flow model can additionally be approximated with a random-walk based model in conjunction with a probabilistic Bayes algorithm.

Further, the flow-based techniques detailed herein can be used to compute a steady state flow from a given source(s) and utilize the same to construct an optimum flow value, as well as the most influential, relevant and/or important set of nodes. One or more embodiments of the invention include allowing for the development of particular variants that can target specific nodes for influence. This can be implemented, for example, in a number of applications in which only a subset of the nodes may be relevant for dissemination of information.

One or more embodiments of the invention include the use of two algorithms. One algorithm includes a greedy algorithm that adds nodes depending upon their quality of the centrality. A second algorithm includes a Bayes traceback algorithm that examines a probabilistic traceback whose end result provides the best spread. As such, in one or more embodiments of the invention, the algorithms work by using a structural analysis methodology which greedily determines the nodes that provide the best spread. Such nodes are determined by using a ranking method which uses the structural and communication ability of neighboring nodes in order to make quick decisions. Also, the use of a Bayes technique picks starting points that maximize the spread in the network.

As detailed herein, one or more embodiments of the invention include the use of an assumption that the universal set of nodes over which a social network is defined is denoted by U, and the edge is set by A. Therefore, the underlying graph is denoted by (U, A). The graph is assumed to be directed, because information flows are specific to direction in the most general case. However, this assumption is not specific to the techniques described herein, and they can be applied to undirected networks. This can be achieved, for example, by replacing an undirected edge with two symmetric directed edges.

The set of nodes from which an incoming edge is incident into node i is denoted by N(i). In other words, N(i)={k: (k, i) in A}. The set of nodes on which the outgoing edges of i are incident are denoted by O(i). Therefore, O(i)={k: (i, k) in A}. It can be assumed that a model of information transmissibility, in which a node i which is exposed to information, can transmit it to one of its neighbors. Information transmission can take on many forms in practical settings, such as, for example, the following.

In a social network, information may be forwarded to any of the friends of a given user in the form of publicly visible text posts, hyperlinks, videos, messages, etc. This user may or may not choose to adopt this piece of information and transmit it further. This may lead to rapid dissemination of the information over the entire network, or a portion thereof.

In a peer-to-peer recommendation or viral marketing system, a user may send a recommendation to any neighbor. The neighbor may or may not make a buying decision based on this recommendation. Furthermore, this recommendation may be forwarded to one of the neighbors of the node. In general, it has been observed that customers in a network-marketing system have a certain value in terms of their ability to influence other members of the network. The determination of flow authorities help in identifying points in the network which lead to the greatest spread of information. The above dynamic can be applicable for a variety of network-based epidemic outbreaks, and may be generalized to social networks, blog posts, water monitoring systems, or any general network infection system which has structural similarity to epidemic outbreaks.

A node is said to be exposed to information bits I, if at least one of its neighbors contains the information I. It is important to note that the concept of neighborhood information exposure, as used herein, only entails the presence of the information at one of its neighbors, rather than any further explanation of what is done with it. The default assumption is that if a node contains some information bits, then all of its neighbors are automatically exposed to those bits. The probability that such an exposure results in eventual information assimilation is determined by a transmission matrix, as also detailed herein. Other definitions of exposure are possible, though this does not change the generality of the overall model. The techniques described herein utilize this definition in order to retain the best notational convenience. The transmission probability along edge (i, j) is denoted by $p_{ij}$. Note that this transmission probability simply indicates the probability that an exposure of node i also results in the {\em information being assimilated by} node j. Node j then automatically becomes eligible to transmit to its neighbors.

The corresponding matrix of transmission probabilities is denoted by $P=[p_{ij}]$. Note that this matrix is extremely sparse, because it is often overlaid on very sparse graphs such as social networks. Also note that if $r_i$ is the probability that a given node I contains information I, then it eventually transmits the information I to adjacent node j with probability $r_i \cdot p_{ij}$. The value of $p_{ij}$ can often be estimated from the underlying data.

As detailed herein, one or more embodiments of the invention include selecting a set of k points in the network that maximizes the aggregate probability of information assimilation over all nodes in the graph. These k nodes are referred to herein as the information authorities in the underlying network. The problem can be summarized as determining the set S of k data points at which release of the information bits I would maximize the expected number of nodes over which I is assimilated.

A challenge exists in that the probability of the spread of the information at any particular node cannot be expressed easily in closed form. Rather, it is described in the form of a non-linear system of equations, as described herein. One or more embodiments of the invention include the assumption that pi(i) is the steady-state probability that node i assimilates the information. Then, the expected steady state number of nodes which assimilate the information are given by $\text{sum}_{i \text{ in } U}$ pi(i). In order for node i to assimilate the information, it must receive the transmission from at least one of its neighbors. On the other hand, in order for node i to not assimilate the information, it must not receive the transmission from any of its neighbors. As such, the probability that none of the neighbors of node i transmit to it is given by $\text{Product}_{1 \text{ in } N(i)}(1-\text{pi}(1) \cdot p_{1i})$. Therefore, it can be stated that:

$$1-pi(i)=\text{Product}_{1 \text{ in } N(i)}(1-pi(1).p_{1i})$$

In addition, for each of the k nodes in S at which the information is released, the corresponding value of pi(.) can be set to 1. Therefore, it can be stated that:
pi(i)=1 for all i in S.

The above system of equations is nonlinear because it uses a product of the probability of (non-)exposure from different neighbors. This is a difficult set of equations to solve, and the corresponding result can be obtained via numerical estimation. Furthermore, it is required to determine the set S optimally. The optimization problem is also challenging. Accordingly, the previous problem can be restated, as detailed below, more formally in terms of the relationships discussed above.

Determine the set S of nodes which maximizes $\text{sum}_{i \text{ in } U}$ subject to the following constraints:
Constraint A: $1-\text{pi}(i)=\text{Product}_{1 \text{ in } N(i)}(1-\text{pi}(1).p_{1i})$ for all i not in S.
Constraint B: pi(i)=1 for all i in S.

Also, one or more embodiments can include a simple algorithm to determine the information authorities with the use of an iterative numerical method, as well as a faster probabilistic method for the same problem using a Bayes model in order to determine the optimal flow authorities.

In order to determine optimal flow authorities, there is a need to evaluate the (aggregate) steady state assimilation probability of all nodes, when the information is released at a particular set of nodes S. In order to design this algorithm, one or more embodiments of the invention include using an iterative algorithm in which $q^t(i)$ denotes the estimation of pi(i) in the t-th iteration. This iterative approach is natural to solve the non-linear system of equations. In each iteration, one or more embodiments of the invention include updating the value of $q^t(i)$ from the value of $q^{t-1}(i)$. The input to the algorithm is the set S at which the information is released.

The algorithm initializes $q^0(i)=1$ for each node i in S and 0 for nodes that are not in S. Subsequently, an iterative approach is used to update the value of $q^{t+1}(.)$, updated from $q^t(.)$. In each iteration, one or more embodiments of the invention track $C_t$, which is the aggregate change in the absolute probabilities from $q_t(.)$ to $q_{t+1}(.)$. The algorithm is terminated when the change in a given iteration is less than 1% of the change in the first iteration. At this point, it is assumed that the probability values have converged to values that are close to their true values.

In one or more embodiments of the invention, this technique for determining the steady-state probabilities can be leveraged in order to determine the optimum set of k nodes at which the information should be released. Accordingly, the techniques detailed herein make use of an approach that maximizes the expected increase in the information spread. The algorithm works with the use of an iterative approach in which the starting point is a candidate set of k nodes and the maximum flow value is continually increased.

One or more embodiments of the invention can include selecting the top k nodes with the largest individual steady state spread as the initial candidate set of flow authorities. In general, flow authorities can be reasonably well separated from one another in order to maximize the probability of propagation of information throughout a social network. In order to achieve this goal, one or more embodiments of the invention can include using a replacement algorithm in which the nodes in U-S are tried as possible replacements for nodes in S in decreasing order of their flow value.

The iterative portion of the algorithm can proceed as follows. In each iteration, a node i is selected from U-S and used to replace a node in S, if such a replacement increases the total flow of S. A variety of nodes may be used to select a node from U-S to replace a node in S. Even though the flow value of i is typically less than that of the node it replaces, the total flow value may increase because of the nature of the network location of the two nodes. For this purpose, the nodes in S are tried as candidates for replacement in ascending value of the steady state spread. The first replacement in this order which increases the objective function for the steady state information spread is executed. It is possible, however, that no such replacement exists. One or more embodiments of the invention continue to try different nodes in U-S for replacement until such attempts are unsuccessful. A variety of different termination criteria can be used in order to define when the algorithm may terminate. Accordingly, when the algorithm terminates, the set of nodes S are reported as the flow authorities.

FIG. 1 is a diagram illustrating example architecture, according to an embodiment of the present invention. By way of illustration, FIG. 1 depicts a computer server 5 containing a central processing unit (CPU) 10, a memory 20, and a disk 30. The disk contains the network structure and data that is used to determine the important nodes. The processing of this network structure is performed in the CPU 10. Software components used to carry out the techniques detailed herein (for example, the steps depicted in FIGS. 2-5) are executed on the CPU. Also, the memory is used in order to cache the intermediate results which are required for the processing.

Figure 2:
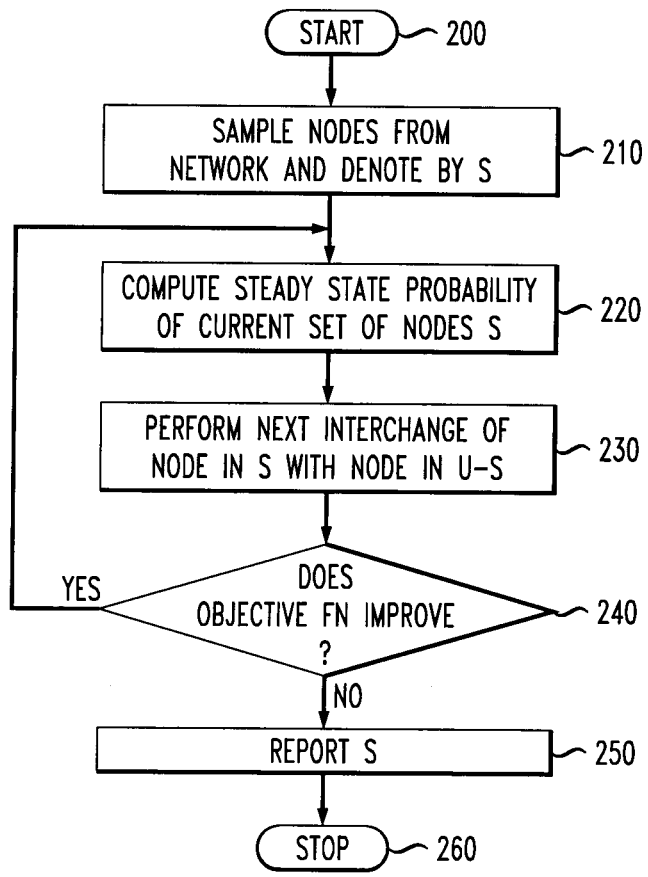
FIG. 2 is a flow diagram illustrating techniques for determining flow authorities, according to an embodiment of the invention.

FIG. 2 is a flow diagram illustrating techniques for determining flow authorities, according to an embodiment of the invention. Step 200 includes starting the process. Step 210 includes creating an initial sample of nodes and denoting the sample by the set S. Step 220 includes computing the steady-state probability of the set of nodes in S. This step is depicted further in FIG. 3. Step 230 includes performing the next interchange of a node in S with a node in U-S. This step is depicted further in FIG. 4. An alternative embodiment of this step is also depicted further in FIG. 5.

Step 240 includes determining if the objective function improves. If this is indeed the case (that is, the objective function improves), then the techniques return to step 220. Otherwise, it can be assumed, in one or more embodiments of the invention, that the lack of improvement signifies that the algorithm has terminated. At this termination point, step 250 includes reporting the set of nodes S as the most important set. Note that, in one or more embodiments of the invention, the termination criterion can be varied considerably. For example, it can be determined if the objective function changed in a certain number of consecutive iterations. Additionally, step 260 includes ending the process.

Figure 3:
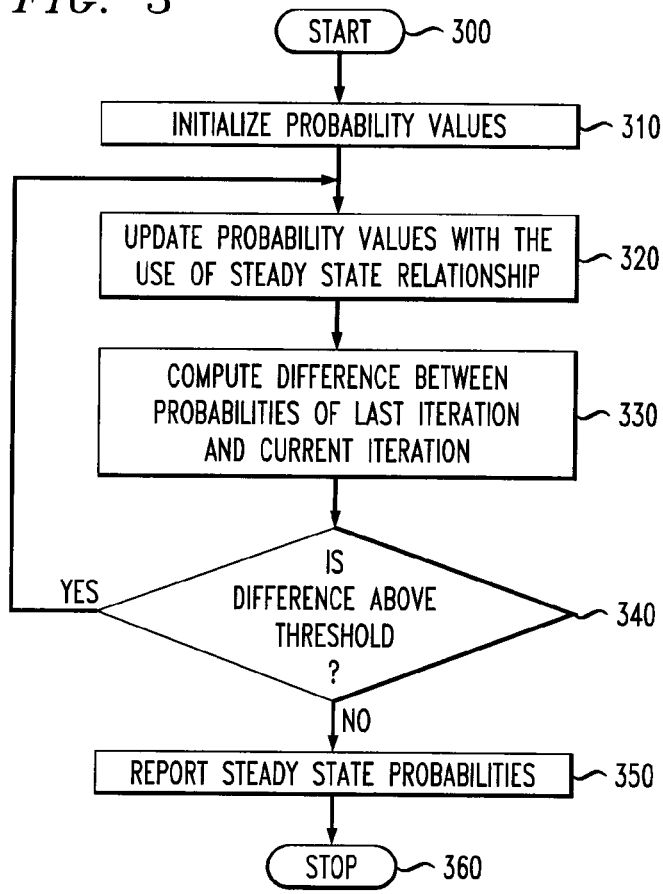
FIG. 3 is a flow diagram illustrating techniques for computing steady-state flow authorities, according to an embodiment of the invention.

FIG. 3 is a flow diagram illustrating techniques for computing steady-state flow authorities (for a given set of nodes), according to an embodiment of the invention. As noted above, FIG. 3 can be considered additional description of step 220 of FIG. 2. Step 300 includes starting the process. Step 310 includes constructing the initial probabilities $q^0(i)$. For each node i in S, one or more embodiments of the invention include setting the value of $q^0(i)=1$, whereas for all other nodes, it is set to 0.

The techniques detailed herein begin with this set of probabilities and successively update the probability values of $q^t(i)$ from $q^{t-1}(i)$. This is analogous to the steady state relationship described earlier herein. The iterative updating of the probability values with the use of this relationship eventually leads to the probability values converging to their steady-state values. The relationship between $q^t(i)$ and $q^{t-1}(i)$ is given by the following:

$1-q^t(i)=\text{Product}_{1 \ in \ N(i)}(1-q^{t-1}(1).p_{1i})$ for all i not in S.
$q^t(i)=1$ for all i in S.

Note that this relationship is based on the steady state relationships of the probabilities described herein. Continuing, step 320 includes updating the steady-state probabilities. Additionally, step 330 includes computing the difference between the probabilities $q^{t-1}(i)$ and $q^t(i)$ (that is, the last iteration and the current iteration). The absolute difference between these different values is summed to create a total difference. Step 340 includes comparing this difference to determine whether or not it is above a given threshold. If this difference is above the pre-defined threshold, the techniques return to step 320. Otherwise (that is, the difference is not above the pre-defined threshold), step 350 includes reporting the steady-state probabilities. These are the probabilities determined in the last iteration. At this point, the algorithm terminates in step 360.

Figure 4:
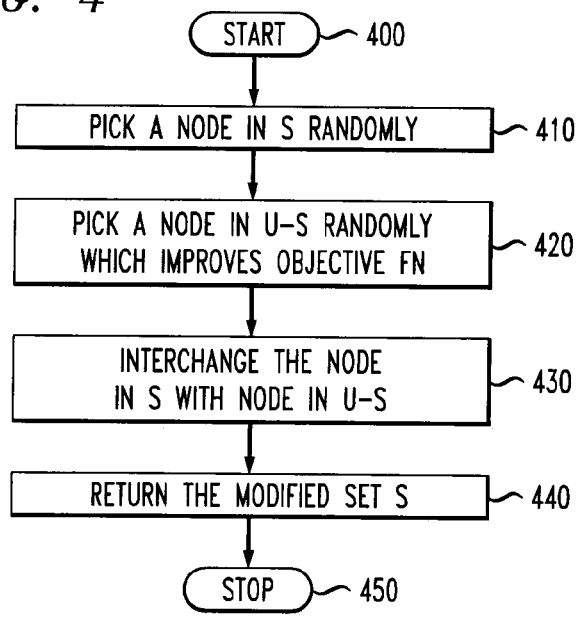
FIG. 4 is a flow diagram illustrating techniques for performing an interchange process for nodes, according to an embodiment of the invention.

FIG. 4 is a flow diagram illustrating techniques for performing an interchange process for nodes, according to an embodiment of the invention. As noted above, FIG. 4 can also be considered additional description of step 230 of FIG. 2. Step 400 includes starting the process. Step 410 includes selecting a node from S at random. Step 420 includes selecting a node from U-S at random, which improves objective function. This is achieved by repeatedly selecting nodes from U-S until one is found that improves the objective function value. If no such node is found in a pre-decided number of iterations, the current node in S is retained. Otherwise, step 430 includes interchanging the nodes and step 440 includes returning the modified node S. Additionally, step 450 includes ending the process.

Figure 5:
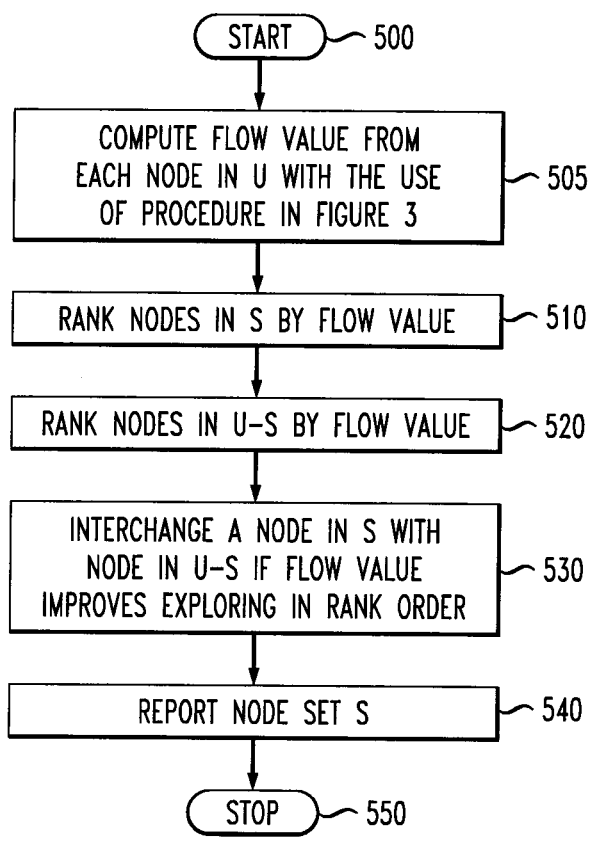
FIG. 5 is a flow diagram illustrating techniques for performing an interchange process for nodes, according to an embodiment of the invention.

FIG. 5 is a flow diagram illustrating techniques for performing an interchange process for nodes, according to an embodiment of the invention. As noted above, FIG. 5 can be considered a depiction of an alternate embodiment of step 230 of FIG. 2. Step 500 includes starting the process. Step 505 includes ranking the nodes in S and U-S with their flow value. In order to achieve this goal, one or more embodiments of the invention include computing the steady state flow from each node in U with the use of the procedure depicted in FIG. 3. Step 510 includes ranking the nodes in S in increasing order of their flow value. In step 520, the nodes in U-S are ranked in decreasing order of their flow value. Step 530 includes using these ranked lists are to perform the interchange. Accordingly, one or more embodiments of the invention include examining the next node in S for replacement in this ranked order after the last that was interchanged. The nodes in U-S are also explored in ranked order for replacement until one is found that improves the steady state flow value. Additionally, step 540 includes reporting the corresponding node set, and step 550 includes ending the process.

Figure 6:
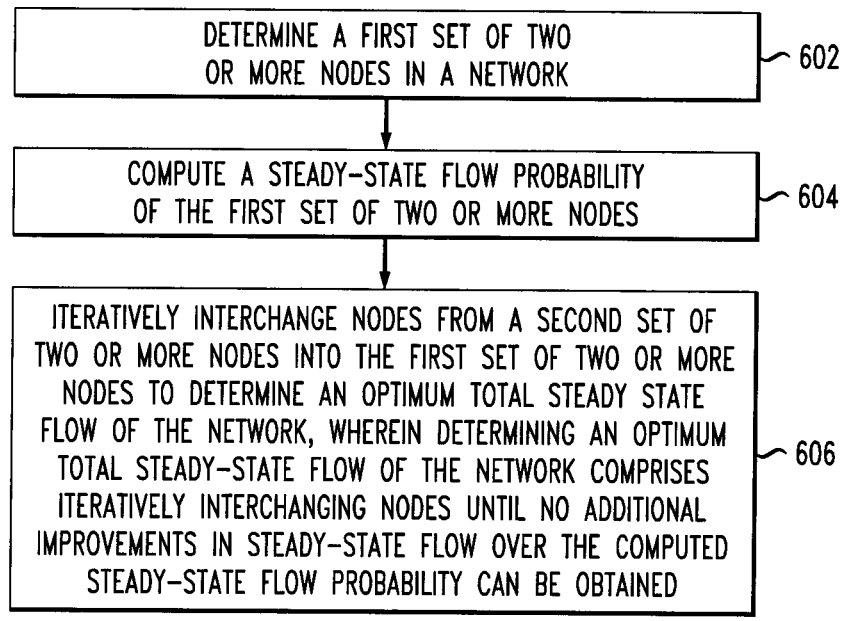
FIG. 6 is a flow diagram illustrating techniques for optimizing steady state flow of a network, according to an embodiment of the invention.

FIG. 6 is a flow diagram illustrating techniques for optimizing steady state flow of a network, according to an embodiment of the present invention. Step 602 includes determining a first set of two or more nodes in a network. This step can be carried out, for example, using a software module and/or component executing on a hardware processor.

Step 604 includes computing a steady-state flow probability of the first set of two or more nodes. This step can be carried out, for example, using a software module and/or component executing on a hardware processor. Computing a steady-state flow probability of the first set of nodes includes computing an initial probability, iteratively updating the initial probability, computing a difference between a preceding iteration and a current iteration, and comparing the difference to determine whether the difference is above a given threshold. Also, one or more embodiments of the invention include continuing with iteratively updating the initial probability if the difference is above the given threshold, and reporting the current iteration as the steady-state flow probability if the difference is below the given threshold.

Step 606 includes iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained. This step can be carried out, for example, using a software module and/or component executing on a hardware processor.

Iteratively interchanging nodes from a second set of nodes into the first set of nodes to determine an optimum total steady state flow of the network can include selecting a node from the first set of nodes at random and selecting a node from the second set of nodes at random. Additionally, iteratively interchanging nodes from a second set of nodes into the first set of nodes to determine an optimum total steady state flow of the network can also include ranking the nodes in the first set of nodes in a list of increasing order of steady-state flow value, and ranking the nodes in the second set of nodes in a list of decreasing order of steady-state flow value. One or more embodiments of the invention also include using the ranked lists to perform the iterative interchange, for example, via selecting a highest ranked node in each list for replacement in a subsequent iteration.

The techniques depicted in FIG. 6 also include, when no additional improvements in steady-state flow over the computed steady-state flow probability can be obtained, reporting the set of nodes in a current iteration as responsible for the optimum total steady state flow.

The techniques depicted in FIG. 6 can also, as described herein, include providing a system, wherein the system includes distinct software modules or components, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
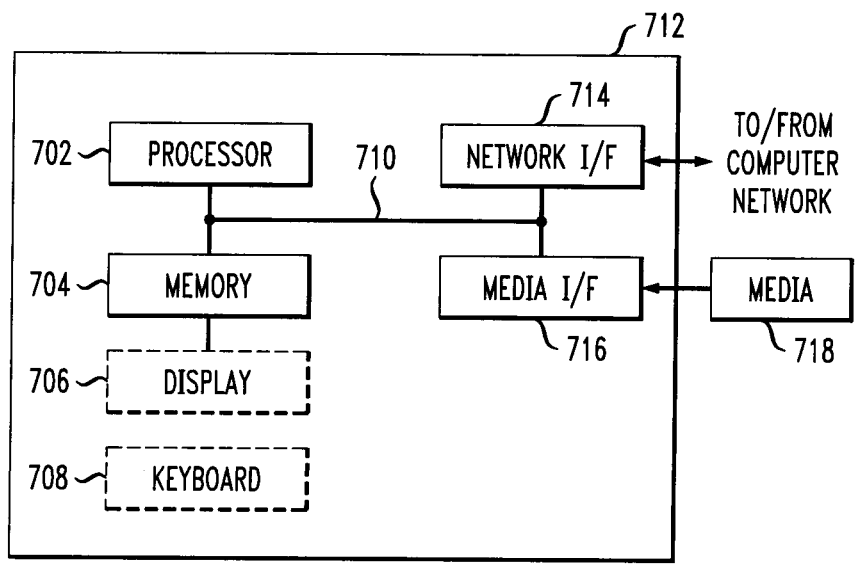
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, computing a steady state flow from a given source(s) and utilizing the same to construct an optimum flow value as well as a set of important nodes.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for optimizing steady state flow of a network, wherein the method comprises:
   determining a first set of two or more nodes in a network;
   computing a steady-state flow probability of the first set of two or more nodes; and
   iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained, and wherein said iteratively interchanging nodes comprises selecting a node from the first set of nodes at random and selecting a node from the second set of nodes at random.

2. The method of claim 1, further comprising, when no additional improvements in steady-state flow over the computed steady-state flow probability can be obtained, reporting the set of nodes in a current iteration as responsible for the optimum total steady state flow.

3. The method of claim 1, wherein computing a steady-state flow probability of the first set of two or more nodes comprises:
   computing an initial probability;
   iteratively updating the initial probability;
   computing a difference between a preceding iteration and a current iteration; and
   comparing the difference to determine whether the difference is above a given threshold.

4. The method of claim 3, further comprising continuing with iteratively updating the initial probability if the difference is above the given threshold, and reporting the current iteration as the steady-state flow probability if the difference is below the given threshold.

5. The method of claim 1, wherein iteratively interchanging nodes from a second set of two or more nodes into the first set of two or more nodes to determine an optimum total steady state flow of the network comprises:
   ranking the two or more nodes in the first set of nodes in a list of increasing order of steady-state flow value; and ranking the two or more nodes in the second set of nodes in a list of decreasing order of steady-state flow value.

6. The method of claim 5, further comprising using the ranked lists to perform the iterative interchange.

7. The method of claim 6, wherein using the ranked lists to perform the iterative interchange comprises selecting a highest ranked node in each list for replacement in a subsequent iteration.

8. A computer program product comprising a tangible computer readable recordable storage medium including computer useable program code for optimizing steady state flow of a network, the computer program product including:
   computer useable program code for determining a first set of two or more nodes in a network;
   computer useable program code for computing a steady-state flow probability of the first set of two or more nodes; and
   computer useable program code for iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained, and wherein said iteratively interchanging nodes comprises selecting a node from the first set of nodes at random and selecting a node from the second set of nodes at random.

9. The computer program product of claim 8, further comprising, when no additional improvements in steady-state flow over the computed steady-state flow probability can be obtained, computer useable program code for reporting the set of nodes in a current iteration as responsible for the optimum total steady state flow.

10. The computer program product of claim 8, wherein the computer useable program code for computing a steady-state flow probability of the first set of two or more nodes comprises:
    computer useable program code for computing an initial probability;
    computer useable program code for iteratively updating the initial probability;
    computer useable program code for computing a difference between a preceding iteration and a current iteration; and
    computer useable program code for comparing the difference to determine whether the difference is above a given threshold.

11. The computer program product of claim 10, further comprising computer useable program code for continuing with iteratively updating the initial probability if the difference is above the given threshold, and reporting the current iteration as the steady-state flow probability if the difference is below the given threshold.

12. The computer program product of claim 8, wherein the computer useable program code for iteratively interchanging nodes from a second set of two or more nodes into the first set of two or more nodes to determine an optimum total steady state flow of the network comprises:
    computer useable program code for ranking the two or more nodes in the first set of nodes in a list of increasing order of steady-state flow value; and
    computer useable program code for ranking the two or more nodes in the second set of nodes in a list of decreasing order of steady-state flow value.

13. The computer program product of claim 12, further comprising computer useable program code for using the ranked lists to perform the iterative interchange.

14. The computer program product of claim 13, wherein the computer useable program code for using the ranked lists to perform the iterative interchange comprises computer useable program code for selecting a highest ranked node in each list for replacement in a subsequent iteration.

15. A system for optimizing steady state flow of a network, comprising:
    a memory; and
    at least one processor coupled to the memory and operative to:
        determine a first set of two or more nodes in a network;
        compute a steady-state flow probability of the first set of two or more nodes; and
        iteratively interchange nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained, and wherein said iteratively interchanging nodes comprises selecting a node from the first set of nodes at random and selecting a node from the second set of nodes at random.

16. The system of claim 15, wherein the at least one processor coupled to the memory is further operative to, when no additional improvements in steady-state flow over the computed steady-state flow probability can be obtained, report the set of nodes in a current iteration as responsible for the optimum total steady state flow.

17. The system of claim 15, wherein the at least one processor coupled to the memory operative to compute a steady-state flow probability of the first set of two or more nodes is further operative to:
    compute an initial probability;
    iteratively update the initial probability;
    compute a difference between a preceding iteration and a current iteration; and
    compare the difference to determine whether the difference is above a given threshold.

18. The system of claim 17, wherein the at least one processor coupled to the memory is further operative to continue with iteratively updating the initial probability if the difference is above the given threshold, and reporting the current iteration as the steady-state flow probability if the difference is below the given threshold.

19. The system of claim 15, wherein the at least one processor coupled to the memory operative to iteratively interchange nodes from a second set of two or more nodes into the first set of two or more nodes to determine an optimum total steady state flow of the network is further operative to:
    rank the two or more nodes in the first set of nodes in a list of increasing order of steady-state flow value; and
    rank the two or more nodes in the second set of nodes in a list of decreasing order of steady-state flow value.

20. The system of claim 19, wherein the at least one processor coupled to the memory is further operative to use the ranked lists to perform the iterative interchange.

21. The system of claim 20, wherein the at least one processor coupled to the memory operative to use the ranked lists to perform the iterative interchange is further operative to select a highest ranked node in each list for replacement in a subsequent iteration.

22. An apparatus for optimizing steady state flow of a network, the apparatus comprising:
- means for determining a first set of two or more nodes in a network;
- means for computing a steady-state flow probability of the first set of two or more nodes; and
- means for iteratively interchanging nodes from a second set of two or more nodes into the first set of two or more nodes to determine an optimum total steady state flow of the network, wherein determining an optimum total steady-state flow of the network comprises iteratively interchanging nodes until no additional improvements in steady-state flow over the computed steady-state flow probability can be obtained, and wherein said iteratively interchanging nodes comprises selecting a node from the first set of nodes at random and selecting a node from the second set of nodes at random.

* * * * *